April 3, 1951 F. H. MUELLER 2,547,831
VALVE
Filed Dec. 26, 1947 5 Sheets-Sheet 1
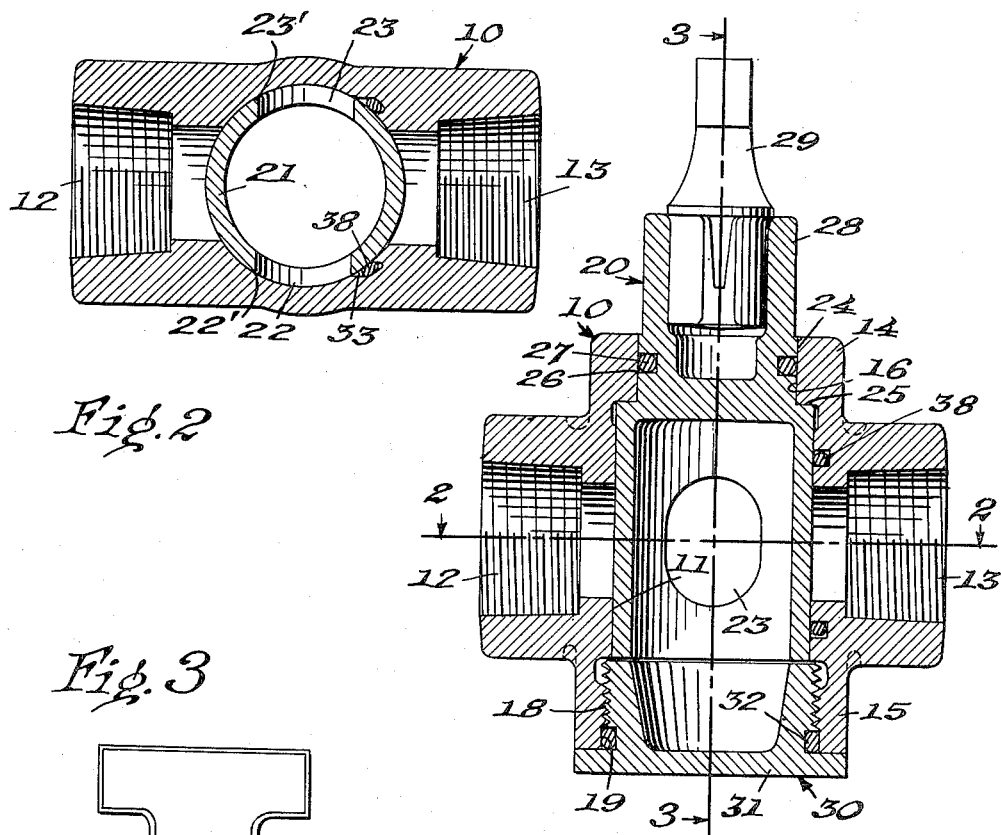
Fig. 1
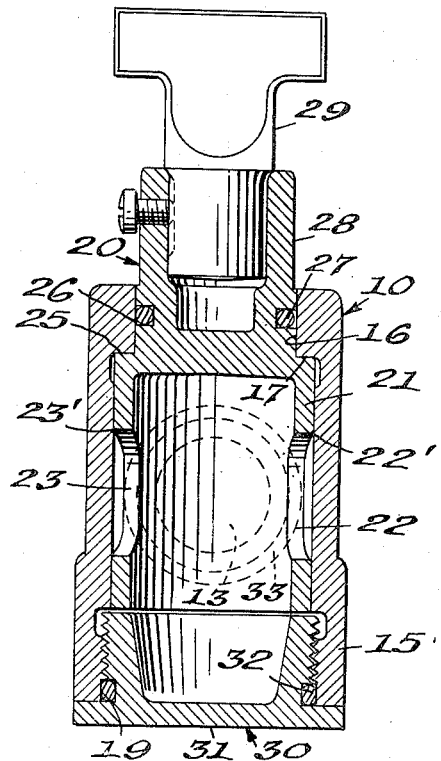
Fig. 2
Fig. 3
Inventor
Frank H. Mueller,
By Cushman Darby & Cushman
his Attorneys April 3, 1951 F. H. MUELLER 2,547,831
VALVE
Filed Dec. 26, 1947 5 Sheets-Sheet 3

INVENTOR.
Frank H. Mueller
BY
Cushman Darby Cushman
ATTORNEYS

April 3, 1951 F. H. MUELLER 2,547,831
VALVE
Filed Dec. 26, 1947 5 Sheets-Sheet 4

INVENTOR.
*Frank H. Mueller*
BY
*Cushman Darby Cushman*
ATTORNEYS

April 3, 1951 F. H. MUELLER 2,547,831
VALVE
Filed Dec. 26, 1947 5 Sheets-Sheet 5

Inventor
Frank H. Mueller
By Cushman Darby Cushman
ATTORNEYS

Patented Apr. 3, 1951

2,547,831

UNITED STATES PATENT OFFICE 2,547,831

VALVE

Frank H. Mueller, Decatur, Ill., assignor to Mueller Co., Decatur, Ill., a corporation of Illinois Application December 26, 1947, Serial No. 793,934

13 Claims. (Cl. 251—103)

This invention relates to rotary plug valves utilizing O-ring as packing means between the plug and seat and has as its object the simplification of such valves with maintenance of operating efficiency. This case is a continuation-in-part of applicant's copending application Serial No. 652,258, filed March 6, 1946, now abandoned.

To this end the new valve, in its simplest form, is a straight-flow valve with a single O-ring groove formed in the seat in surrounding relation to the outlet port. An O-ring set in the groove in a valve seat around an inlet port tends to be protruded from the groove and nipped by the edge of the plug port as closed position is approached. This difficulty is avoided in the new construction by the use of an O-ring around the outlet port only since the protrusion effect does not occur at this port. The edge of the plug port is, however, chamfered to avoid possibility of damage to the ring when the latter is normally passed in the operation of the valve.

Inasmuch as a conical plug is rather tightly seated under spring pressure and thus tends to prevent proper access of pressure to an O-ring, the new valve utilizes a cylindrical plug so that the slight clearance which necessarily exists between the plug and seat by reason of manufacturing tolerances, enables the pressure to reach the O-ring with operative effect.

Another object of the invention consists in positioning a rubber deformable O-ring in an annular groove formed in the inner wall of a high pressure valve body and around the outlet port. The width of this groove between its inner and outer walls is not greater than the width or cross sectional diameter of the O-ring, and the length of the outer wall of the groove is less than the outer periphery of the O-ring so that when the ring is inserted into the groove, it is squeezed between the walls thereof and compressed against the outer wall of the groove to prevent lateral rolling or sliding of the ring in the groove. Moreover, the center of the groove is positioned inside the normal center of the O-ring to cause the ring when inserted in the groove, to be pressed more tightly and have a greater contact area against the outer wall of the groove than against its inner wall. On the other hand, when the plug is rotated from its on to off-position, the impact of the trailing edge of the plug port moves or rolls the O-ring away from the outer wall of the groove and into compressing contact with the inner wall and bottom of the groove to allow the edge of the port plug to pass over the O-ring without pinching or injuring the latter.

A further object consists in associating with a slidable or reciprocating valve, an O-ring deformable packing located in a groove in the valve body around the outlet port only, so as to be maintained within the groove by the force of the fluid line pressure, and which is automatically operable to increase its sealing effectiveness as the fluid line pressure increases in the valve.

In the accompanying drawings:

Figure 1 is an axial section of a valve in accordance with the invention.

Figure 2 is a section on line 2—2 of Figure 1.

Figure 3 is a section on line 3—3 of Figure 1.

Figure 4:
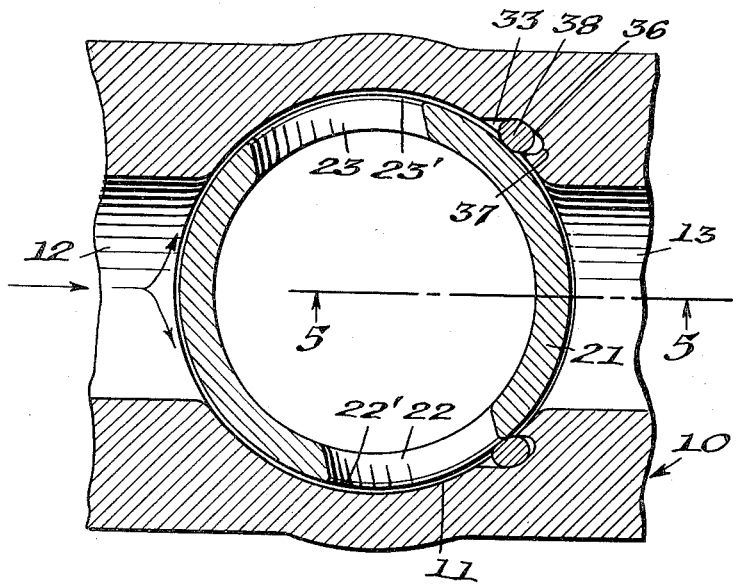
Figure 4 is a partial section like that of Figure 2, enlarged.
Figure 6:
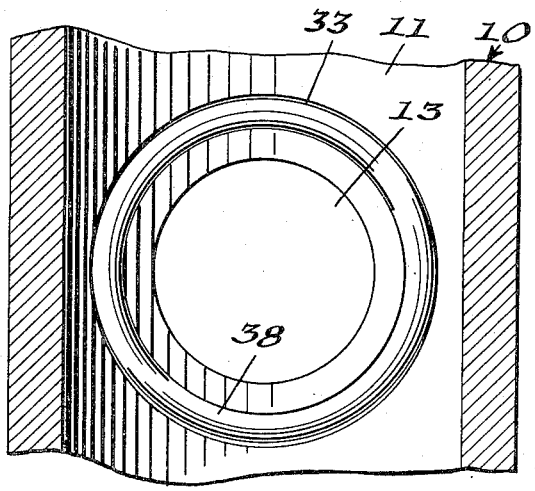
Figure 6 is a partial section like that of Figure 3, enlarged, and with the plug removed.

The valve comprises a housing 10 provided with a cylindrical seat 11 whose axis is intersected by the axis of diametrically opposed inlet and outlet ports respectively designated by reference numerals 12 and 13. The inlet and outlet ports 12 and 13 are internally threaded to receive complementary threaded pipe sections of a high pressure fluid line to which the valve is connected. The housing includes top and bottom neck portions 14 and 15 on the axis of the seat. Neck 14 has a bore 16 coaxial with the seat and of somewhat smaller diameter than the latter so that an annular shoulder 17 is provided. Neck 15 has a bore coaxial with and somewhat larger than the seat and provided with threads 18 and a smooth annular inner terminal portion 19.

Reference numeral 20 designates a plug having a cylindrical portion 21 cooperating with seat 11, the plug being here shown as hollow for the sake of conserving metal. The plug has a transverse flow passage including opposed ports 22 and 23 respectively registrable with the inlet and outlet ports of the housing.

Surmounting the plug is a reduced cylindrical portion 24 journalled in bore 16 and a shoulder 25 between portions 21 and 24 engages shoulder 17 to limit upward movement of the plug. Portion 24 has an annular groove 26 opposed to bore 16 and containing a rubber O-ring 27 to prevent the escape of pressure. Portion 24 is surmounted by a socket portion 28 in which is engaged the shank of a T 29.

Threaded in neck 15 is a closure member 30 which includes an end wall 31 with an annular flange engaging the extremity of neck 15 and inwardly of the flange the closure is provided with an annular groove opposite groove 19 and containing a rubber O-ring 32. The closure underlies plug portion 21 to limit downward movement of the plug, the clearances being such as to give an easy turning action.

Formed in the seat 11 around port 13 and concentrically with the latter is an annular groove 33 having an inner side wall 34 and an outer side wall 35, these walls being parallel throughout to the axis of port 13. In other words, as here shown, the groove side walls are concentric with the outlet port. In the upper and lower portions of the groove, its bottom wall 36 is normal to the side walls. However, the bottom wall winds to the disposition most clearly shown in Figure 4 so that it remains substantially normal to radii of the seat and has a substantially constant depth throughout radially of the seat. The substantially right-angled corner between the inner side wall 34 and the bottom wall 36 at the top and bottom of the groove becomes more and more curved and in the horizontal section of Figure 4 becomes a substantial curve 37. Disposed in the groove is a rubber O-ring 38 which is preferably normally somewhat compressed between plug portion 21 and the groove bottom.

Figure 5:
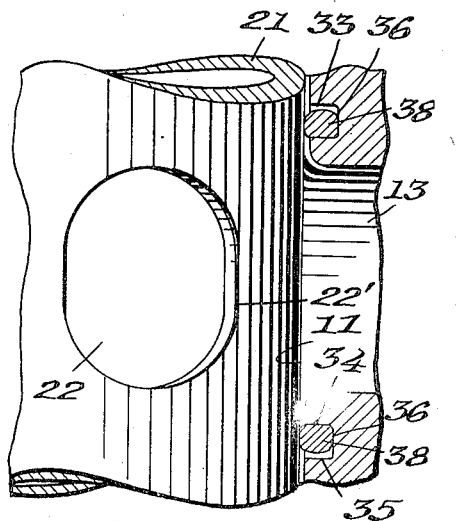
Figure 5 is a partial section on line 5—5 of Figure 4.

With the plug in closed position, pressure can readily reach the O-ring through the normal clearance existing between the plug and seat, this clearance being somewhat exaggerated in Figures 4 and 5. The pressure acts to contract and bulge the O-ring as indicated in Figures 4 and 5 so that an effective seal is provided between the seat and plug.

In Figure 4, the plug is assumed to be turning clockwise to closed position. The outer edge 22' of port 22 is chamfered and, consequently, will not injure the O-ring when passing the latter as shown at the bottom of Figure 4. Port 23 has a chamfered outer edge 23'.

It is unnecessary to limit the turning range of the plug and either of ports 22 and 23 may be the inlet and the other the outlet. It is for this reason that the outer edges of both ports are chamfered. If means were to be provided limiting the plug to a 90° turn so that the same port would always be the outlet port, it would be necessary to chamfer the outer edge of that port only. However, it is a feature of the present invention that such stop means can be eliminated. As here shown, the plug is turnable back and forth or always in one direction or the other between on and off-positions.

Figure 7:
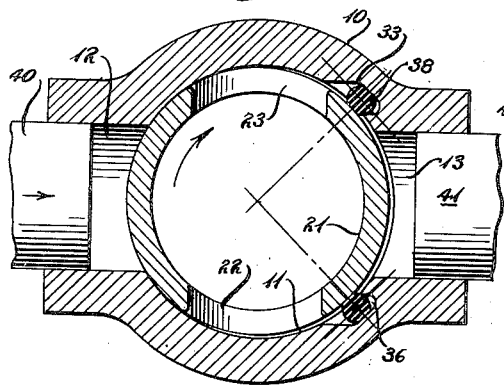
Figure 7 is a sectional plan view showing the plug in its closed position prior to the application of line pressure to the valve, and connected to a high pressure line.
Figure 8:
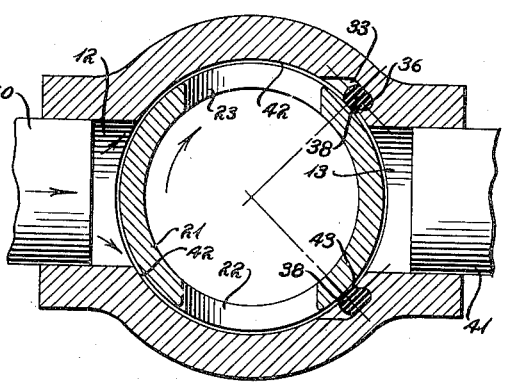
Figure 8 is a view similar to Figure 7 showing the position of the valve parts when line pressure is applied.
Figure 12:
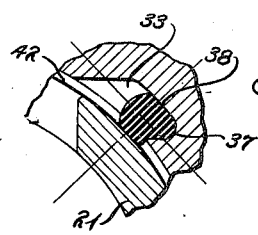
Figure 12 is an enlarged detail sectional view of Figure 8.

The efficiency and advantage obtained by locating the O-ring in the body of the valve adjacent the outlet port, will be appreciated from a consideration of Figures 7, 8 and 12, which show the valve body 10 connected at the inlet port 12 and the outlet port 13 to pipe sections 40 and 41 respectively of a water, gas or oil high pressure distributing line. Figure 7 shows in somewhat exaggerated manner what occurs when the cylindrical portion 21 of the plug is inserted in the body of the valve and prior to the application of line perssure and with the valve off. It will be seen that the O-ring 38 is relaxed within the annular groove 33 and that the cylinder 21 leans lightly against the opposite wall of the body adjacent the inlet port 12. Figure 8 shows the condition after the line fluid pressure is applied and it will be noted that cylinder 21 now straightens up under force of the inlet line pressure and reacts against the O-ring 38 so as to apply the necessary compression to make a secure initial seal between the plug and the valve body. At the same time it equalizes the space or clearance 42 between the plug and the body. The inlet fluid pressure introduced into the valve body through the space 42 as indicated by the arrows (Fig. 8) will now pack the O-ring 38 tighter against the curved wall 37 of the groove 33 as the fluid pressure increases. The friction between the parts is now reduced to a minimum due to the fact that only the O-ring 38 bears against the plug.

Figure 9:
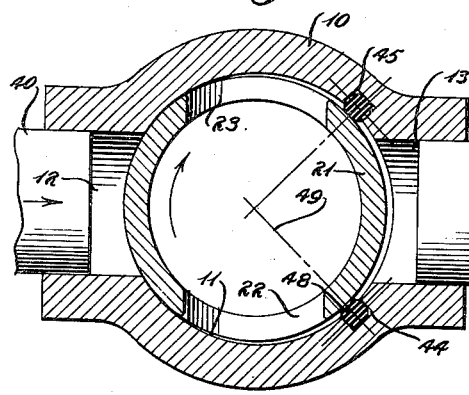
Figure 9 is a sectional plan view of a rotary valve showing a modified form of packing with the valve closed and the position of the parts prior to line pressure being applied to the valve.
Figure 10:
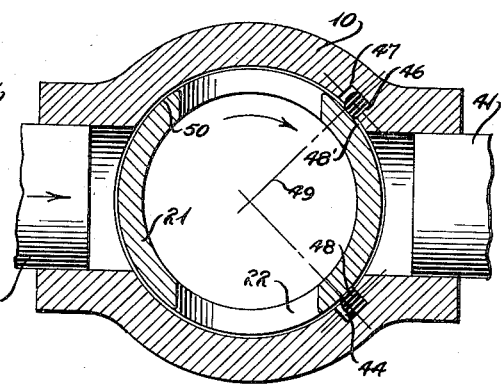
Figure 10 is a view similar to Figure 9 showing the position of the parts when line pressure is applied.

In the modification shown in Figures 9, 10, 11 and 23, the valve body 10 and its associated parts are substantially similar to the form of valve previously described, and the seat 10 is provided with an annular groove 44 concentric with the outlet port 13 and is formed with a bottom 45 and parallel inner and outer side walls 46 and 47 respectively, so as to be of substantially rectangular or square formation. A deformable rubber O-ring or packing 48 fits within the groove 44 and preferably is a little larger in outside diameter than the outer wall 47 of the groove and also a little larger in body or cross-sectional diameter than the width of the groove 44, as more clearly shown in Figures 21 and 22, so that when the O-ring is initially inserted in the groove it presses against the outer wall to keep it in the groove more securely as the plug is being inserted. Of course, if the fluid pressure is turned on while the plug is in closed position, the O-ring will be contracted as shown in Figure 10. It will be noted from Figure 10 that the side walls 46 and 47 of the groove are located substantially parallel to radial lines 49 which pass through the axis of the plug.

Figure 21:
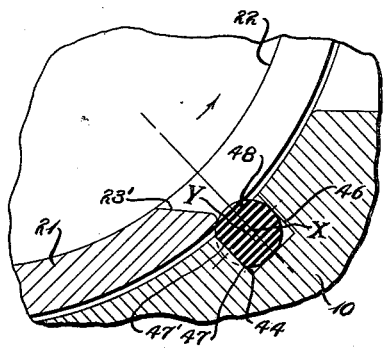
Figure 21 is an enlarged detail sectional view of Figure 9, with the plug and O-ring in the position assumed when the plug is being moved to its opened position.

It has been found advantageous in a valve having a single O-ring in the valve body around the outlet port, not only to have the O-ring press more tightly against the outer wall of the groove, but also to have the body of the O-ring fit closely between the walls of the groove, as more clearly illustrated in Figure 21, in which the center or middle X of groove 44 is inside the normal center Y of O-ring 48. In other words, the width of the groove 44 is equal to or less than the normal body or cross-sectional diameter of the O-ring 48, and the developed length of the annular center line of the groove is equal to or less than that of the normal annular center line of the O-ring. Moreover, the outer wall 47 of the groove is a little less in width than the outer periphery of the O-ring so that the ring is slightly contracted by the outer wall 47 and slightly squeezed between the walls of the groove. As shown in Figure 21, when the O-ring 48 is inserted in the groove 44, the ring presses more tightly against the outer wall 47 of the groove than against the inner wall 46, and has a greater contact area 47' against the outer wall of the groove than against its inner wall, so as to securely hold the ring in the groove 44 when the plug 21 is being inserted in the valve body. This arrangement precludes a condition shown in Figure 20, wherein the O-ring 48' is centered in the groove 44'.

Figure 22:
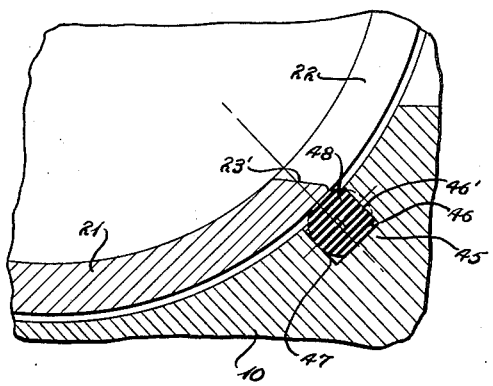
Figure 22 is an enlarged detail sectional view similar to Figure 21 with the plug advanced further to its opened position.
Figure 20:
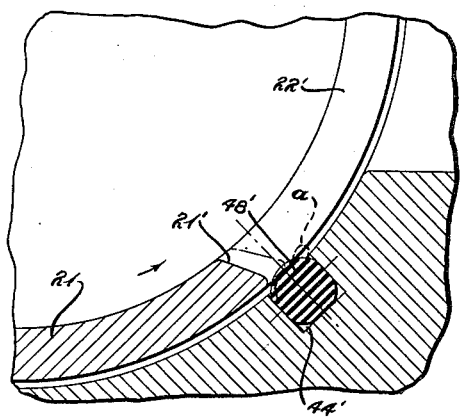
Figure 20 is an enlarged detail sectional view similar to Figure 9, but without the O-ring protective features shown in Figure 9.
Figure 23:
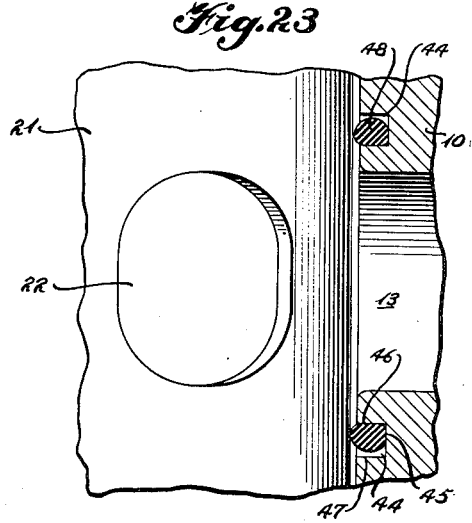
Figure 23 is a central detail vertical sectional view of Figure 9.

The construction shown in Figure 20 has the serious disadvantage that when the plug 21, or other ported valve member, is being moved in the direction of the arrow to on-position, as shown, the trailing edge 21' of the plug port 22' (Fig 20) will engage the portion of the ring 48' which is exposed in the port 22', and as the edge 21' of the port moves forward to its dotted line position, it will form a bulge a in the O-ring, as shown in dotted lines. It will be impossible to move the valve member further toward on-position without pinching off the bulge a between the edge of the port and the far or inner edge of the groove, and thus rendering the O-ring ineffective for further use. However, with the arrangement shown in Figures 21 and 22, when the edge 23' of the port 22 contacts the O-ring 48 in moving toward on-position it shifts the stress in the rubber ring 44 to the inner side wall 46 and the bottom 45 of the groove 44, as illustrated in Figure 22, with the result that the ring has a greater contact area 46' against the inner side wall 46 of the groove than against the outer side wall 47, thus permitting the wall of the plug or other ported member to ride over the packing ring 48 without danger of injuring the ring or interfering with the rotary movement of the plug. When the cylinder portion 21 of the plug 20 is in the position shown in Figure 22, the port 22 is partly open and the opposite side of the plug 10 is in metal-to-metal contact with the valve body. The edge 23' of the plug port is enabled to ride over the packing or O-ring as a result of the ring being forced against the inner side wall and the bottom of the groove 44, so that the packing is definitely flattened on these two sides as clearly shown in this figure.

Figure 11:
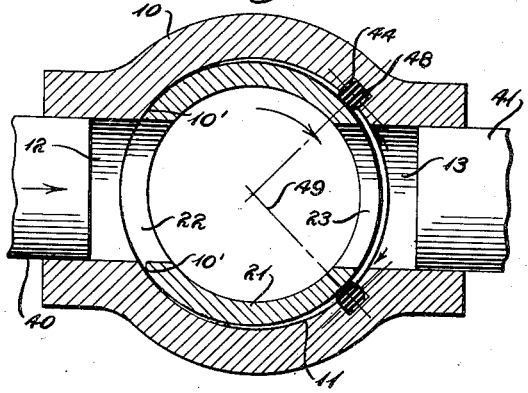
Figure 11 is a view showing the valve in Figure 9 in its opened position so as to allow line pressure fluid to pass through the valve body.

Figure 9 shows the position of the O-ring 48 in the groove 44 when the plug is closed and there is no fluid pressure in the line. It might be mentioned that the O-ring would assume the same position when the valve is moved to its on-position and no pressure applied. Figure 10 shows the valve closed with fluid pressure being applied in the direction of the arrow and it will be noted that the line fluid pressure passing in the space 50 between the valve and the plug forces the packing 48 into compressed engagement with the inner side wall 46 and towards the outlet 41 so as to center the plug and place the O-ring under fluid pressure. The radial groove 44 also presents either side wall 46 or 47 squarely against the O-ring 48 to aid in maintaining the packing steady when the plug is rotated in either direction. It might be mentioned that the space or clearance 50 between the valve body and the plug is shown exaggerated and is not under .003" which will be too narrow or small to allow the entrance between the walls of fine sand, grit and the like, but sufficient to permit line pressure to force the resilient rubber body of the O-ring 48 into the groove so as to contract the same. Figure 11 shows the functioning of the O-ring when the valve is open and the fluid pressure differential is reduced by the condition of flow of the liquid through the valve. It will be noted that the fluid pressure on each side of the O-ring 48 is now equalized as indicated by the arrows and that the tendency of the O-ring to resume its normal bodily cross-section forces the cylinder 21 lightly against the opposite side of the seat 11 as at 10' thus positively precluding the entrance of sand and other foreign particles between the opposed walls, which might become embedded in the O-ring and cause scratching of the smooth surface of the plug. This is highly important since in order to insure efficient operation of the valve it is necessary that the portion of the wall of the plug which contacts with the O-ring be maintained perfectly smooth. When the ports 22 are in open position as shown in Figure 11, the packing or O-ring is inactive in so far as the fluid pressure is concerned, and the force of the slightly compressed packing is sufficient to hold the side of the plug adjacent the inlet 12 in metal-to-metal contact with the opposite side of the valve body.

The effectiveness of the packing may be enhanced by lubricating the O-ring and its associated groove preferably with a heavy grease. Instead of chamfering the edges of the ports of the rotatable plug as shown in Figures 1 to 4 inclusive, the edges shown in Figures 9, 10 and 11, of the plug ports may be made to operate satisfactorily by touching up the edges with a suitable abrasive tool so as to smooth the same and remove all burrs.

Figure 13:
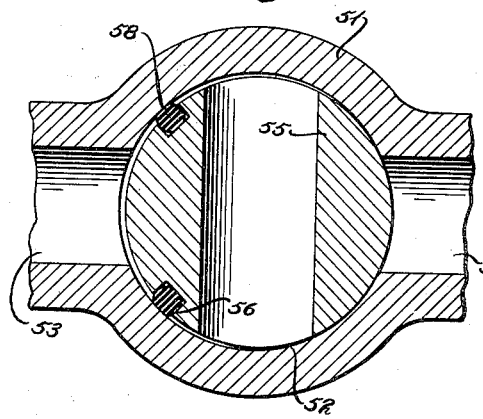
Figure 13 is a sectional plan view showing the O-ring packing positioned in an annular groove on the plug and adjacent the inlet port and with the valve closed.
Figure 14:
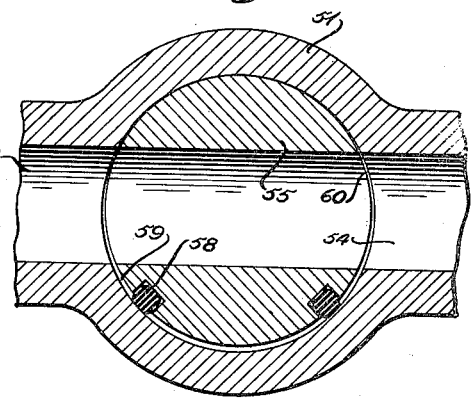
Figure 14 is a view similar to Figure 13 with the valve turned to its opened position.

To illustrate the advantages of positioning the packing on the valve body around the outlet port, Figures 13 and 14 have been added, which show the O-ring packing carried by the rotary plug and adjacent the inlet opening when the plug is closed. In these two figures, 51 indicates the valve body having a vertically disposed seat 52 which is intersected by the inlet port 53 and the outlet port 54. A plug 55 is rotatably mounted in the seat and is provided with an annular groove 56 opposite to and surrounding the inlet port 53 when the plug is in its closed position. The plug 55 also has a transverse passage arranged to register with the inlet and outlet ports when the plug is in its on or open position, so as to permit the fluid line pressure to pass through the valve body. A deformable rubber O-ring or the like 58 is positioned in the annular groove 56 and when the plug is in its closed position it will be seen that if the O-ring is of the usual size, it will not be tight enough to provide an initial seal and will not be aided by straightening up of the plug when the fluid pressure is applied. On the contrary, the plug will remain off-center and assume the position as shown in Figure 13. It is because of this that valves of this type usually have an O-ring on each side of the plug between the ends of the plug ports so that the rings will function to center the plug in the body and will be under equal compression. It is a common weakness of such valves that the first time the O-ring in the plug working at the outlet side completes its seal against the plug before the ring seals at the inlet side, the fluid pressure will instantly bulge a portion of the ring out of its groove into the gap left between the edge of the groove back of the ring and the edge of the body port, and get it pinched in two between the metal edges referred to. When broken pieces of the ring pass on through the valve the plug with the single ring on the inlet side tends to take the position shown in Figure 13 thus destroying its efficiency, since the single ring does not fill up the space between the plug and body and provide the initial compression that is necessary to enable the automatic sealing function to be initiated. It will be seen that a similar condition occurs if an O-ring is placed in the valve body on the outlet side and another O-ring placed on the inlet side. Manifestly, in placing an O-ring on each side of the valve body each ring would be of less diameter or width in cross section than a single ring since the two rings would center the plug in the valve body and would be difficult to insert the plug between two thicker rings unless the grooves were made deeper. In the closed position of the plug the O-ring on the inlet side does the work due to the fact that as long as it remains intact it provides an effective seal for the fluid pressure from the O-ring on the outlet side. However, the inlet O-ring if located in the valve body, soon would be destroyed in the same manner as the ring in the plug on the outlet port and the plug would then take the position as shown in Figure 7 but with a single ring too small to function effectively. Manifestly, such an occurrence on high pressure lines or in handling acids and the like are open to the same dangers and disadvantages as the disintegration of a ring in the plug opposite the body inlet. Referring to Figure 14 which shows the open position of the plug of Figure 13, it will be seen that the space 59 communicates with the inlet port 53 of the body and promotes the flow of the line pressure between the walls of the plug and the body around the outer periphery of the packing. As a result the scale and particles of foreign matter will not only be carried into contact with the O-ring 58 but will become wedged towards the opposite end 60 of the space and scratch the smooth surface of the plug seat which contacts the O-ring thus destroying the effectiveness of the automatic fluid pressure seal.

As the particular shape of the groove 33 (Fig. 2) renders it difficult to keep the O-ring 38 in the groove while the plug is being inserted in the valve body and since the inner wall of the groove presents an edge to the O-ring and the outer wall a sloping surface at the curved portion thereof, which interferes somewhat with the free sliding action of the plug 21 against the O-ring when the plug is rotated, the groove in the valve body is preferably of the rectangular form shown in Figures 9, 10 and 11, in which the O-ring is of slightly greater width and located around the outlet port, and in which the walls 46 and 47 of the groove are substantially parallel to radial lines passing through the axis of the bore of plug 21 as clearly indicated in Figure 9. By arranging the groove with radial walls it has been found that the valve can be more readily assembled and that the O-ring stays in the groove better than it does in a groove shaped as in Figure 2. In other words, while the form of groove shown in Figure 2 enables the O-ring to function properly, the form disclosed in Figure 9 affords an easier assembly of an O-ring in the body and the ring does not have a tendency to spring out of the groove under its own resiliency or wedge between the plug and the body when the plug is rotated.

The following advantages of having a single deformable rubber ring or the like located in the valve body around the outlet port will be obvious from a consideration of Figures 7 to 11 inclusive:

(1) When the plug is in closed position and the pressure off as shown in Figures 7 and 9, the O-ring is under very light compression between the walls of the plug and the valve body, and the plug leans lightly against the opposite wall of the body. Consequently, with this arrangement it is easy to insert the O-ring without danger of nicking the bearing surface of the O-ring.

(2) With the plug closed and the fluid pressure on as shown in Figures 8 and 10, the plug centers itself in a floating position in the body and in so doing increases the initial compression on the ring so that it will hold the fluid pressure until the automatic functioning of the ring begins. At the same time, the space between the plug and the body is so narrow as to prevent the entrance of sand and particles of foreign matter between the walls, but sufficient to remove practically all friction between the opposed metal walls, thus leaving only the friction between the ring and the plug to oppose the rotation of the plug.

(3) When the plug is in its open position as shown in Figure 11, the fluid pressure on each side of the O-ring is equalized, and the initial compression of the O-ring forces the plug lightly against the opposite wall of the body. The contact of the plug with the inlet wall of the body provides a shut-off or seal against sand and other small hard particles escaping between the walls and scratching the smooth surface of the plug which contacts with the O-ring.

(4) The most important feature of all is that with the O-ring in the body around the outlet port, the line fluid pressure holds the ring in its groove whereas with the O-ring in the inlet side of the body the line pressure would force the ring out of its groove at the instant the seal is effected between the plug and the valve body. This is clearly shown in Figures 8 and 10 of the drawings and if those figures are read with the flow reversed, viz, moving into the valve through fitting 41. Assuming that the plug has been in on-position and has been rotated clockwise to return to its off-position, it will be clear, that the communicating ports while fluid was flowing through the valve, allow the O-ring to relax due to the low pressure of the flowing fluid being equal on all sides of the ring. However, the instant the trailing edge of the transverse flow passage in the plug provides a seal with the O-ring, the entire initial fluid pressure is exerted against the O-ring tending to force the same more tightly into its groove (Figs. 8 and 10).

Assuming that the O-ring is positioned in the body around the inlet port or that the direction of flow in Figure 8 is reversed from that shown by the arrows, it will be seen that the instant the seal is effected, the entire initial pressure will be exerted against the ring 38 tending to blow it out through the groove between the narrowing space between the edge of the flow passage of the plug and the far edge of the O-ring groove where the bulging portion of the ring will be sheared or pinched in two between the opposed metal edges of the valve body and plug.

It will also be observed that if a single ring is placed in the plug on the inlet side (Fig. 13) it will be open to the disadvantages that it will not center in the body and the O-ring will not receive the increased initial compression to assume the compressed position as shown in Figures 8 and 10, when the fluid pressure is turned on, and the plug is in its off-position. Moreover, the plug will not assume a floating position but will be pressed in a tighter metal-to-metal contact with the body so that there will be increased friction to oppose rotation of the plug and to grind gritty matter between the opposed walls. Additionally, as clearly exemplified in Figure 14 a crack or clearance is left at the inlet side when the plug is in on-position through which gritty matter may be washed between the walls of the plug and the body that scratches and mars the smooth surface of the plug that contacts with the O-ring and thus materially lessens the efficiency of operation of the valve. It might also be mentioned that a valve having two diametrically opposed O-rings while capable of use in installations where the pressure is built up across the valve when it is closed, such as drain valves and the like where there is no pressure except static pressure, or internal liquid pressure built up in the system after the drain valve is closed, are not practical as a line valve for the reason that if the rings are placed in the body, the one on the inlet side will inevitably be forced out of its groove by the pressure and pinched in two between the edge of the plug port and the edge of the ring groove. If the rings are placed in the plug, the same thing will happen to the ring on the outlet side of the valve, then the plug is moved off-center and the valve becomes not only useless but dangerous if installed on a high pressure line or a line carrying inflammable fluids such as gas or acids.

Thus, it will be seen that by locating the rubber ring or packing in the valve body around the outlet port, the O-ring is deformable by the line pressure to automatically increase the effectiveness of the seal as the pressure increases. Moreover, at no time during the operation of the valve is there greater friction opposing rotation of the plug than that resulting from the contact between the O-ring and the opposing metal surface of the plug under the fluid pressure then prevailing. Such a valve is capable of holding pressure from a few pounds per square inch to several thousand pounds if necessary. As valves with mechanical compression packings cannot withstand such high pressures they cannot be used for the same purpose as a valve constructed in accordance with the present invention. Moreover a valve having a rubber ring which is used only as a compression packing, requires the packing to be compressed to a degree that will enable it to hold the highest fluid pressure to which it may be subjected. For this reason, valves having a compression packing between relatively movable members have much more friction than is necessary when used in lower pressures. This is not true in the case of an O-ring packing arranged in accordance with the present invention in which the increased fluid pressure automatically packs the O-ring tighter to increase the holding effectiveness of the seal. The automatic packing feature associated with the line valve has been found to be durable, efficient and safe in service, particularly when connected with curb stops and the like, since it permits easy rotation of the plug under all operating conditions.

It might be mentioned that the main difficulty and danger in using an O-ring valve occurs primarily when the valve is used to control fluid in a line under pressure. In other words, O-rings may safely be disposed in several ways in a drain valve which is used to hold only a static head or liquid pressure built up against it while it is closed. As liquid is incompressible, it will be seen that any pressure in the line, drops to that in the head, the instant the valve is opened. Consequently, the O-ring and its position in the groove is not disturbed.

Tests conducted with high pressure valves provided with O-rings show that (1) when two O-rings are used in the plug in a fluid pressure line, the ring on the outlet side invariably is destroyed and the other ring on the inlet side soon fails to hold the pressure, (2) the reverse condition will prevail if two O-rings are used in the body, (3) a single O-ring in the plug on the outlet side is destroyed, (4) a single O-ring in the body at the inlet side is destroyed; but (5) a single O-ring located in the body around the outlet port is maintained in its groove by the force of the outgoing fluid pressure and will remain intact during repeated cycles of opening and closing of the valve so as to last almost indefinitely.

When the valve and its associated parts are in the closed position shown in Figures 7 and 9, the cylinder 21 of the plug may be rotated clockwise to its open position and the O-ring will be retained in its groove without being pinched or mutilated by the turning of the plug. Similarly, when the valve is closed and inlet pressure applied and the parts assume the position as shown in Figures 8 and 10, the rotation of the plug clockwise will cause the compressed deformable body of the O-ring to assume its normal circular or elliptical shape and be positioned now within the groove so as not to be cut or pinched by rotation of the plug to its open position as shown in Figure 11.

Figure 15:
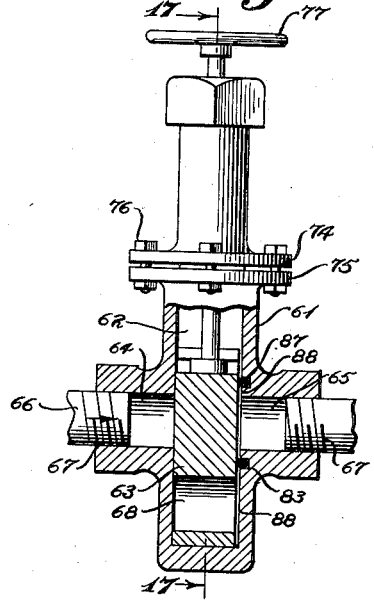
Figure 15 is a vertical sectional view of a slidable gate valve provided with the improved packing around the outlet port thereof and the position of the parts before line pressure is applied.
Figure 16:
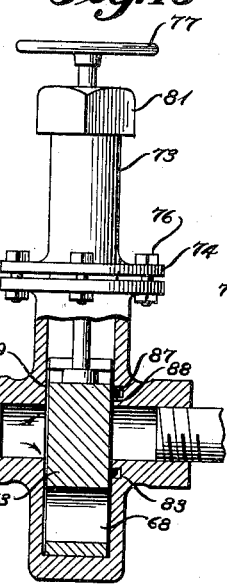
Figure 16 is a view similar to Figure 15 showing the position of the parts upon the application of line pressure.
Figure 17:
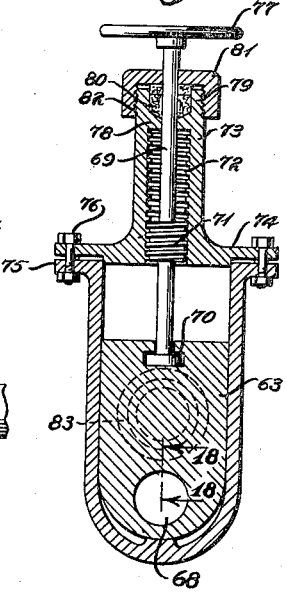
Figure 17 is a sectional view taken substantially along the line 17—17 of Figure 15.
Figure 18:
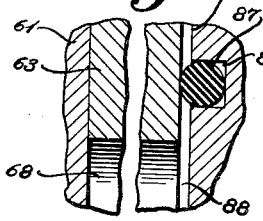
Figure 18 is an enlarged sectional detailed view taken substantially along the line 18—18 of Figure 17.
Figure 19:
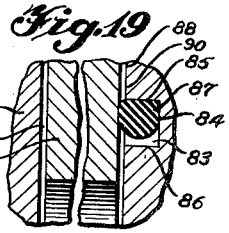
Figure 19 is an enlarged detail view of the lower portion of the O-ring and groove shown in Figure 16.

In the modified form of the invention shown in Figures 15 to 19, 61 indicates the body of a slide valve having a vertically disposed bore 62, the wall of which constitutes a seat for a flat slide or gate valve 63. Extending laterally and from opposite sides of the valve body are aligned inlet and outlet ports 64 and 65 respectively, which are interposed in a high fluid pressure line 66 and connected to spaced opposed end sections of the line as at 67. The gate valve 63 is provided at its lower end with a transverse flow passage or opening 68 which is arranged to be moved into registry with the aligned inlet and outlet ports 64 and 65, so as to allow the fluid under pressure to pass through the valve. An operating shaft 69 is connected at its lower end as at 70 to the top of the slide valve 63 and may be provided intermediate its ends with an enlarged threaded portion 71 which engages complementary internal threads 72 formed on the neck 73. The neck 73 is preferably provided with an annular flange 74 which abuts complementary formed flanges 75 on the valve body and may be secured thereto in any suitable manner such as by the bolts 76. The upper end of the shaft 69 extends outwardly from the neck 73 and may be provided with a handle or wheel 77 for moving the gate valve 63 into and out of its on-position. The upper portion of the neck 73 may be formed with a solid web portion 78 provided with a recess 79 for receiving a packing 80 that provides a seal for preventing the escape of the fluid upwardly through the top of the neck. A retaining cap or nut 81 may be detachably connected as at 82 to the neck so as to retain the packing in position. The inner wall of the bore or seat 62 is provided with an annular groove 83 which surrounds the outlet port 65. The groove 83 may be square or rectangular shape and has a bottom wall 84 and parallel inner and outer side walls 85 and 86 respectively (Fig. 19). A deformable rubber O-ring packing 87 is positioned in the groove 83 so as to bear against the adjacent side wall of the gate valve 63 and preferably is larger in diameter than the outer side wall of the groove. As shown in Figures 15 and 18, the valve is closed and no fluid pressure is being applied. The O-ring 87 is now under slight compression and moves the gate valve 63 to form the space or clearance 88 on the side of the valve adjacent the outlet port 65, and moves the opposite flat side of the valve against the wall of the bore 62 to prevent the entrance of sand, grit and other foreign particles from entering the bore from the inlet port 64. It will be understood that the valve 63 and the packing 87 assume the same position when the opening 68 is moved to register with the ports 64 and 65 to allow fluid pressure to pass through the valve. Figures 16 and 19 show the position of the valve and the O-ring 87 when the valve is closed and the pressure is turned on in the direction as indicated by the arrows (Fig. 16). An extremely narrow space 89 is now formed between the gate 63 and the inner face of the seat 62 adjacent the inlet port 64. In this position the O-ring 87 is compressed and forced against the inner side wall 85 (Fig. 19), by the force of the fluid pressure escaping through the space 89, then above and below the gate valve 63 and into opposite sides of the space 88 so as to substantially equalize the spaces on opposite sides of the gate valve, so as to provide an efficient seal for preventing the escape of fluid pressure into the outlet port 65. The spaces 88 and 89 are substantially the same width and sufficiently small or narrow to prevent sand, grit and other foreign particles from working their way into the bore 62 and scratching or marring the surface of the gate which contacts the surface of the O-ring. In this connection it might be mentioned that it is important that both in a slide valve and a rotary valve that a mirror-like finish be maintained on the surface which contacts the O-ring packing, since if this surface becomes scratched it causes the valve to leak and destroys the automatic functioning of the O-ring under fluid pressure and the seal becomes an ordinary packing joint. The outer surface of the valve body may be provided with an arrow or the like, to indicate the direction of flow of the fluid pressure in the line to which it is connected. When the gate valve is moved to its opened position the parts will function substantially in the same manner as the packing 48 shown in Figure 11. In other words, the O-ring associated with the slide valve possesses the same relative features and functions the same as it does when used with a rotary plug valve. Moreover, the O-ring being located in the body around the outlet port will be centered when the fluid pressure is on and the compression exerted on the ring will increase in proportion to the inlet pressure so that the O-ring will hold the fluid pressure until the automatic functioning of the ring begins.

It is significant to note that the locating of a deformable O-ring in the valve body around the outlet differs functionally from the use of a packing element retained in position under pressure of a spring or the like, since the sealing efficiency of the latter is entirely dependent upon the strength of the spring, as contrasted to the use of a rubber O-ring which is constricted and deformed so that its sealing efficiency is automatically controlled and increases as the pressure of the line fluid increases.

A deformable rubber O-ring or packing as constructed in accordance with the present invention and located in the inner wall of the valve body around the outlet opening has the following essential characteristics which distinguish it from a mechanical compression packing: (1) The sealing effect of the slight initial compression of the rubber ring between the movable member and the stationary member is only for the purpose of providing a low pressure seal, which acts as a preponderance over the reaction of the fluid pressure. (2) The strength or relative effectiveness of this seal automatically increases with the fluid pressure, so that there is no limit, short of the point of disintegration of the rubber mass, to the fluid pressure which the seal will hold. (3) The fluid pressure must act on the O-ring from only one side of the ring. This forces it against the opposite wall of the groove and into any space between the movable and stationary members. (4) A slight space must be left between the movable member and the stationary member to admit the fluid pressure into the O-ring groove. (5) A valve sealed with an O-ring will be usable, subject to the strength of the valve body on a range of fluid pressures from a few pounds to several thousand pounds per square inch. (6) As the increased fluid pressure automatically packs the O-ring tighter to increase the holding effectiveness of the seal, the friction between the movable and stationary members is at no time greater than necessary to hold the fluid pressure then existing. Whereas, in a valve having a rubber ring which is used only as a compression packing element, it is necessary to compress this ring to a degree which will enable it to hold the highest fluid pressures to which it may be subjected.

For this reason, valves having a compression packing between relatively movable members have much more friction than necessary when used on the lower pressures. That is not true in an O-ring valve.

While in their broader aspect the new valves are not necessarily limited to the use of the particular forms of grooves disclosed, these forms are very practical important features from a casting or machining standpoint. On the other hand, the disclosed forms of grooves are not necessarily limited to use in the specific valves here disclosed, and may be efficiently used with various types of rotary and slidable valves associated with high pressure lines.

I claim:

1. In a valve structure for controlling the flow of fluid under high pressure through a line, a valve housing including a seat having inlet and outlet ports at opposite sides thereof, a valve element including a flow passage, said valve element being movable in said housing seat between on and off positions with respect to the housing ports, said valve element being provided with a smooth seating surface opposed to the seat of said housing, the seat of said housing being provided with a single continuous groove substantially concentric with the axis of the housing outlet port and lying closely adjacent said outlet port, the walls of said groove being rigid, a bodily resilient endless packing ring in contact with the rigid bottom wall of said groove, the transverse dimension of the seating surface of said valve element being less than the corresponding dimension of the housing seat to provide a space between the seating surface and seat, but which space is of such transverse dimension as to prevent entry of fine grit particles thereto, the normal cross-sectional size of said ring being sufficiently oversize with respect to the depth of the housing groove that (a) when the valve element is in closed position and not under line pressure, said ring will be under sufficient compression as to hold the valve element seating surface in non-spaced relation with the portion of the housing seat adjacent the housing inlet port, (b) when said valve element is subject to line pressure and in open position so that the fluid pressure differential between the valve element inlet and outlet ports is thereby reduced, said ring will firmly contact with the opposed portion of the valve element to hold the valve element seating surface in non-spaced relation with the portion of the housing seat adjacent the housing inlet port to prevent flow of foreign particles into the space between the valve element seating surface and the housing seat, and (c) when the valve element is in closed position and subject to fluid pressure, fluid may move from the valve element inlet port and into the space about the valve element seating surface to enlarge the ring along lines transverse to the direction of such fluid flow to thereby maintain said ring in sealing contact with the opposed portion of the valve element seating surface and the portion of the groove furthest from the housing inlet port.

2. A valve structure of the character described in claim 1 wherein the space between the valve element seating surface and the housing seat is of the order of three-thousandths of an inch.

3. A valve structure of the character described in claim 1 wherein said housing seat and said valve element are cylindrical and said valve element is rotatable in the housing seat.

4. A valve structure of the character described in claim 1 wherein said valve element is reciprocable along a line transverse to the axis of the housing outlet port.

5. A valve structure of the character described in claim 1 wherein the housing groove includes side walls substantially parallel throughout their length to the axis of the housing outlet port.

6. A valve structure of the character described in claim 1 wherein the housing groove includes side walls substantially parallel throughout their length to each other.

7. A valve structure of the character described in claim 1 wherein said housing seat and said valve element are cylindrical and said valve element is rotatable in the housing seat and the groove includes side walls which, throughout their length, are parallel to lines passing through the valve element axis.

8. A valve structure according to claim 1 wherein the width of the groove is not greater than the normal body or cross-sectional diameter of the packing ring.

9. A valve structure according to claim 1 wherein the developed length of the annular center line of the groove is not greater than that of the normal annular center line of the packing ring.

10. A valve structure according to claim 1 wherein the width of the groove is not greater than the normal body or cross-sectional diameter of the packing ring, and wherein the developed length of the annular center line of the groove is not greater than that of the normal annular center line of the packing ring.

11. A valve structure according to claim 1 wherein said housing seat and said valve element are cylindrical, said element is rotatable in the housing seat, and wherein the width of the groove is not greater than the normal body or cross-sectional diameter of the packing ring, and wherein the developed length of the annular center line of the groove is slightly less than that of the developed length of the center line of the packing ring so that when the packing ring is inserted in the groove, the ring presses more tightly and has a greater contact area against the outer side wall of the groove than against its inner side wall in order to prevent the ring from being pinched when the valve element is rotated.

12. A valve structure according to claim 1 wherein the groove includes inner and outer side walls and the width of the groove between the inner and outer side walls thereof is not greater than the width or cross-sectional diameter of the packing ring, and the length of the outer side wall of the groove is less than the outer periphery of the packing ring, so that when the ring is inserted in the groove and the valve element is in closed position and not under line pressure, the ring is squeezed between the walls of the groove and the center of the groove is positioned inside the normal center of the packing ring to cause the ring to be pressed more tightly and have a greater contact area against the outer side wall of the groove than against the inner side wall thereof.

13. A valve structure according to claim 1 wherein said housing seat and said valve element are cylindrical, said valve element is rotatable in the housing seat, and wherein the width of the groove between the inner and outer side walls thereof is not greater than the normal width or cross-sectional diameter of the packing ring, and the length of the outer side wall of the groove is less than the outer periphery of the packing ring, so that when the ring is inserted into the groove it is squeezed between the walls of the groove and the center of the groove is positioned inside the normal center of the packing ring to cause the ring to be pressed more tightly and have a greater contact area against the outer side wall of the groove than against the inner side wall thereof, to prevent the ring from being pinched by the valve element when the latter is rotated from its closed position to its open position, the impact of the trailing edge of the valve element flow passage during rotation of the valve element to its on-position moving or rolling the packing ring away from the outer side wall of the groove and into compressing contact with the inner side wall thereof to allow the trailing edge of the valve element flow passage to pass over the packing ring without pinching or damaging the latter.

FRANK H. MUELLER.

REFERENCES CITED

The following references are of record in the file of this patent:

UNITED STATES PATENTS

| Number | Name | Date |
|---|---|---|
| 1,868,147 | Kruse | July 19, 1932 |
| 2,314,683 | Berry | Mar. 23, 1943 |
| 2,383,983 | Melichar | Sept. 4, 1945 |
| 2,433,732 | Brown | Dec. 30, 1947 |